No. 732,707. Patented July 7, 1903.

UNITED STATES PATENT OFFICE.

THOMAS J. CARLTON, OF IOLA, KANSAS.

COMPOSITION OF MATTER USED FOR PROTECTING THE WALLS OF RETORTS, &c.

SPECIFICATION forming part of Letters Patent No. 732,707, dated July 7, 1903.

Application filed November 21, 1902. Serial No. 132,319. (No specimens.)

*To all whom it may concern:*

Be it known that I, THOMAS J. CARLTON, a citizen of the United States, residing at Iola, in the county of Allen and State of Kansas, have invented a new and useful composition of matter to be used to protect earthen retorts in smelters and furnaces and to save metal from being absorbed into the walls of said retorts, of which the following is a specification.

My composition consists of the following ingredients, combined in the proportions stated, viz: water, substantially pure, fifteen gallons; cobalt, twenty-five ounces; black lead, (graphite,) twenty-five pounds; burnt powder of fire-clay, ten pounds; saltpeter, (potassium nitrate,) one pound. These ingredients are to be thoroughly mingled by agitation.

In using the above-named composition the retorts or earthen vessels should be thoroughly coated both inside and out with said composition about four hours before being placed in the kiln where the retort or vessel is heated and hardened.

By the use of the above composition the coating on the outside of the retort protects the retort from iron, zinc, or other metals which may drip or percolate through the furnace, thereby acting as or serving the purpose of a retort fender or protector.

By the use of the above composition the coating on the inside of the retort prevents the metal which is being melted in the retort from being absorbed into the walls of the retort, thereby acting as or serving the purpose of a retort metal-saver.

What I claim, and desire to secure by Letters Patent of the United States, is—

1. The herein-described composition of matter consisting of water, cobalt, black lead, burnt powder of fire-clay, and saltpeter, substantially as described and for the purposes specified.

2. The herein-described composition of matter for protecting retorts and saving metal, consisting of pure water fifteen gallons, cobalt twenty-five ounces, black lead twenty-five pounds, burnt powder of fire-clay ten pounds, saltpeter one pound, substantially as described.

In testimony whereof I have signed my name to this specification in the presence of two subscribing witnesses.

THOMAS J. CARLTON.

Witnesses:
J. W. BOLTON,
W. D. COPE.